June 29, 1965

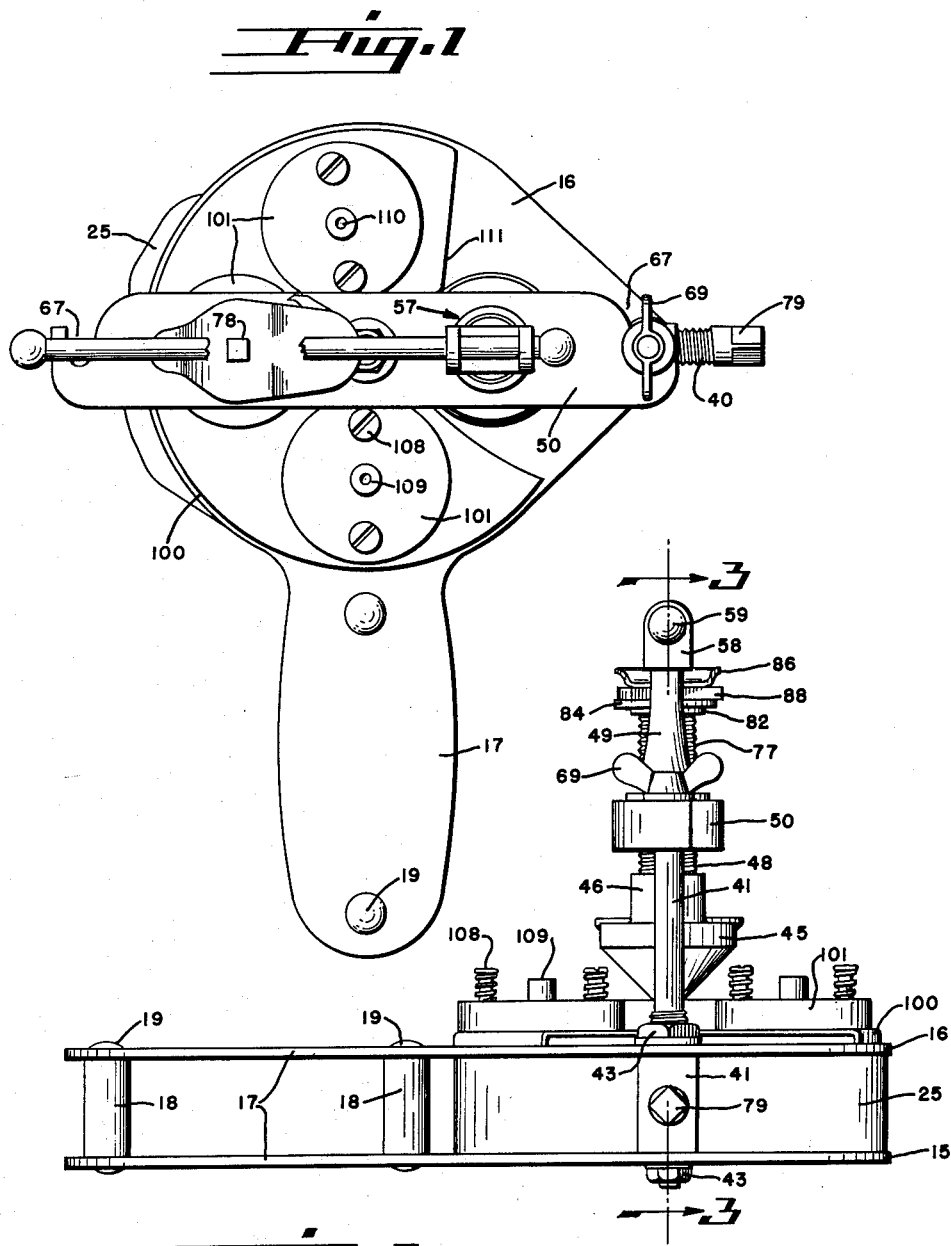

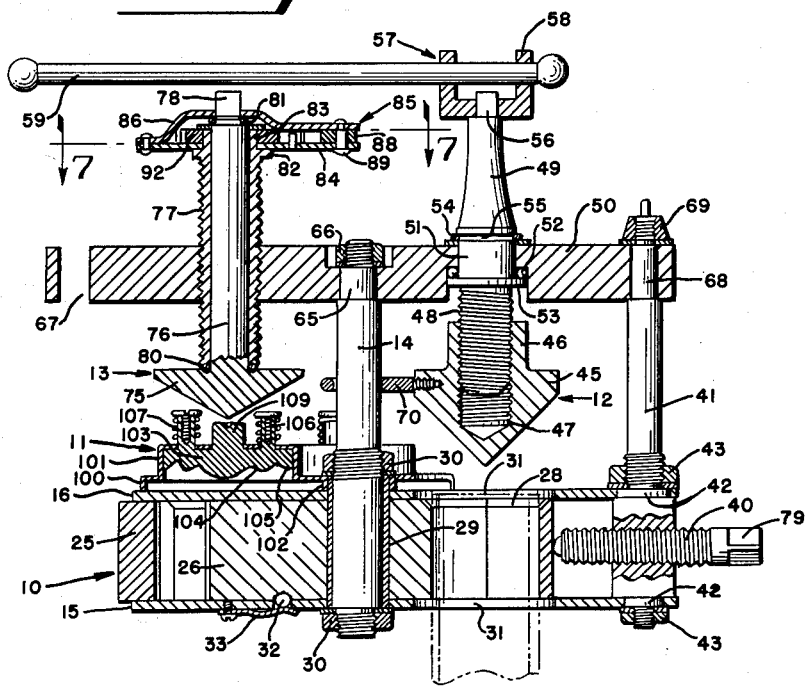
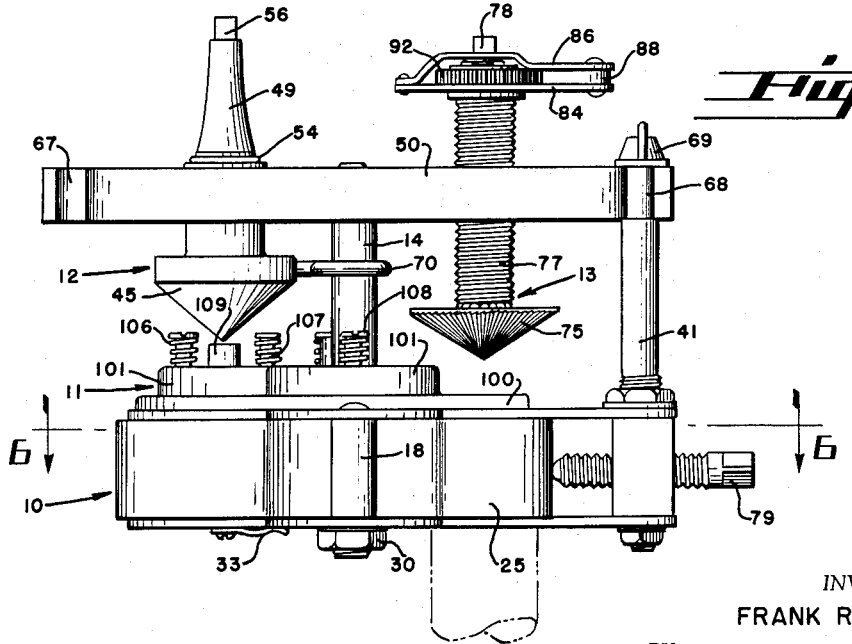

F. R. WILSON 3,191,420

FLARING TOOL

Filed Nov. 26, 1963

6 Sheets-Sheet 3

INVENTOR.
FRANK R. WILSON.
BY
DES JARDINS, ROBINSON, TRITLE & SCHENK.
HIS ATTORNEYS.

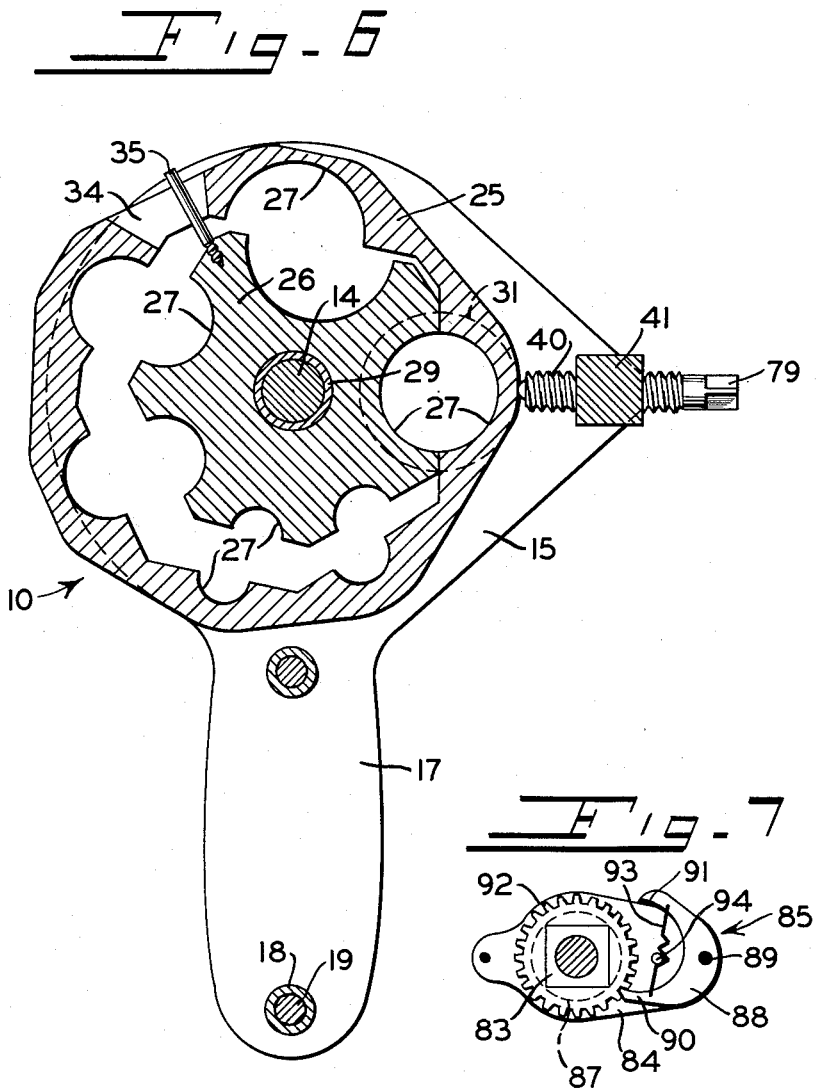

June 29, 1965    F. R. WILSON    3,191,420
FLARING TOOL

Filed Nov. 26, 1963    6 Sheets-Sheet 5

INVENTOR:
FRANK R. WILSON
BY
Harrington A. Lackey
ATTORNEY

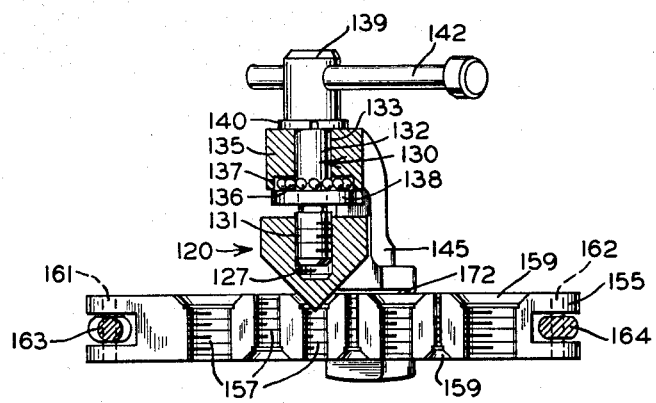
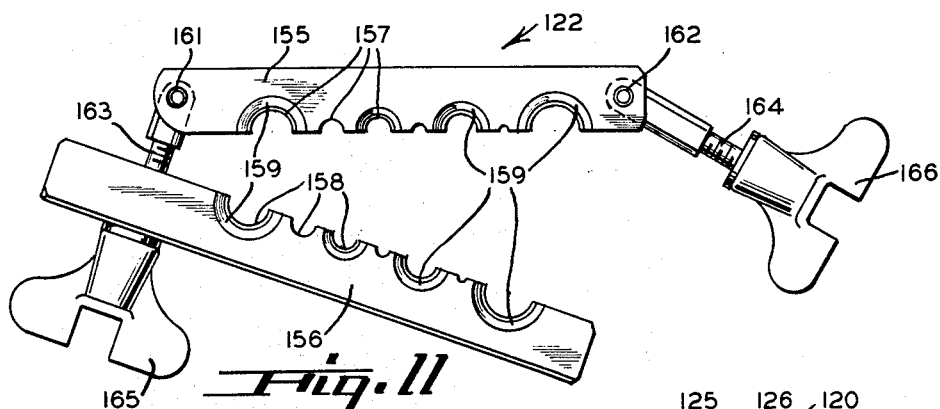
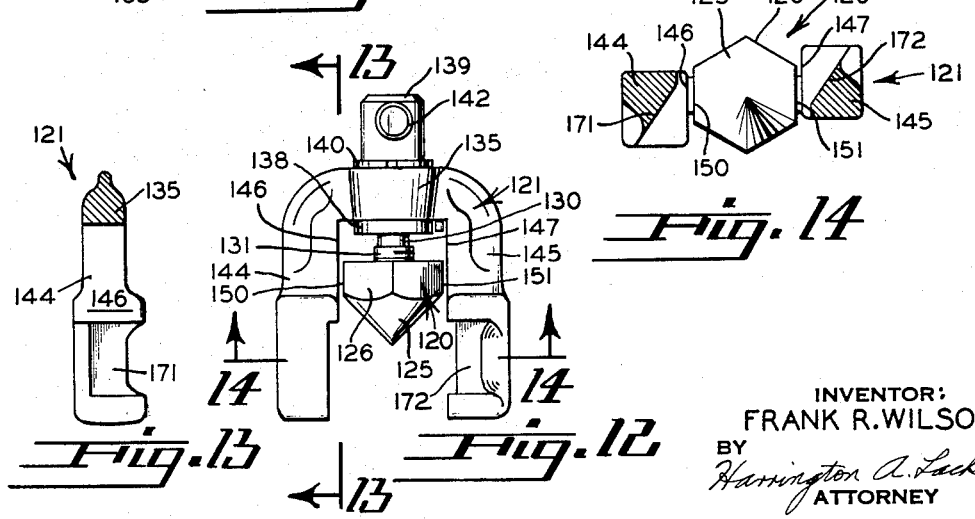

United States Patent Office 3,191,420
Patented June 29, 1965

3,191,420
FLARING TOOL
Frank R. Wilson, Memphis, Tenn., assignor to Parker-Hannifin Corporation, Cleveland, Ohio, a corporation of Ohio
Filed Nov. 26, 1963, Ser. No. 327,580
13 Claims. (Cl. 72—317)

This application is a continuation-in-part of patent application Ser. No. 708,114, filed January 10, 1958, now abandoned, which was a division of co-pending application for Letters Patent, Serial No. 338,303, filed February 24, 1953, now Patent No. 2,852,839.

This invention relates to a tube flaring tool, and more particularly to a combination type of tool which is of extremely compact construction while at the same time providing all the features heretofore provided by a plurality of separate tools.

Tube flaring tools are ordinarily used by workmen engaged in the installation or repair of equipment in the field. The tools are usually carried by the workmen in tool kits and it is therefore desirable that they be made as compact and self-contained as possible. By so doing the space taken up by the tool and the weight thereof is kept at a minimum and the possibility of the various component parts thereof becoming separated or lost is greatly reduced. Also, by combining into a single tool all of the features of the different tools usually used in tube flaring operations, the flaring job is made easier and can be performed much more rapidly and conveniently than where a number of separate tools must be handled.

It is, therefore, an object of the present invention to provide a single tool possessing all of the features of the various individual tools usually used in tube flaring operations.

Another object of the present invention is to provide a single, unitary tool for clamping, reaming, shaping and flaring the end of a piece of thin-walled tubing.

Another object of the invention is to provide a feeding mechanism for a reamer which can be disconnected at will so as to permit the reamer to be rotated without feeding.

Another object of the invention is to provide a reamer and a flaring cone mounted on a common, pivoted arm so that either tool may be swung into position over the end of the tube to be flared.

Another object of the invention is to provide a slidably and non-rotatably mounted flaring cone which is provided with internal screw threads meshing with the external threads of a rotatably and non-slidably mounted feeding screw.

Figure 5:
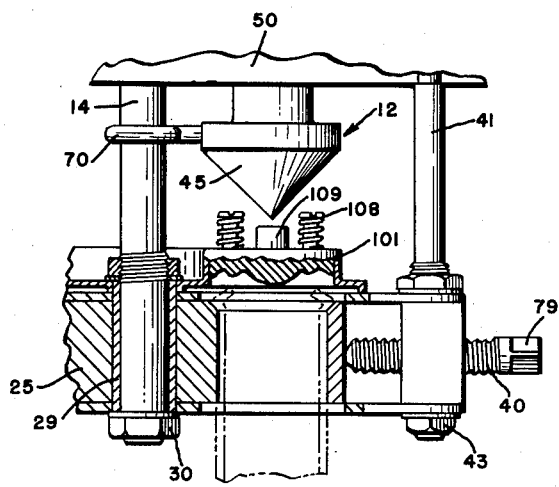
Figure 8:
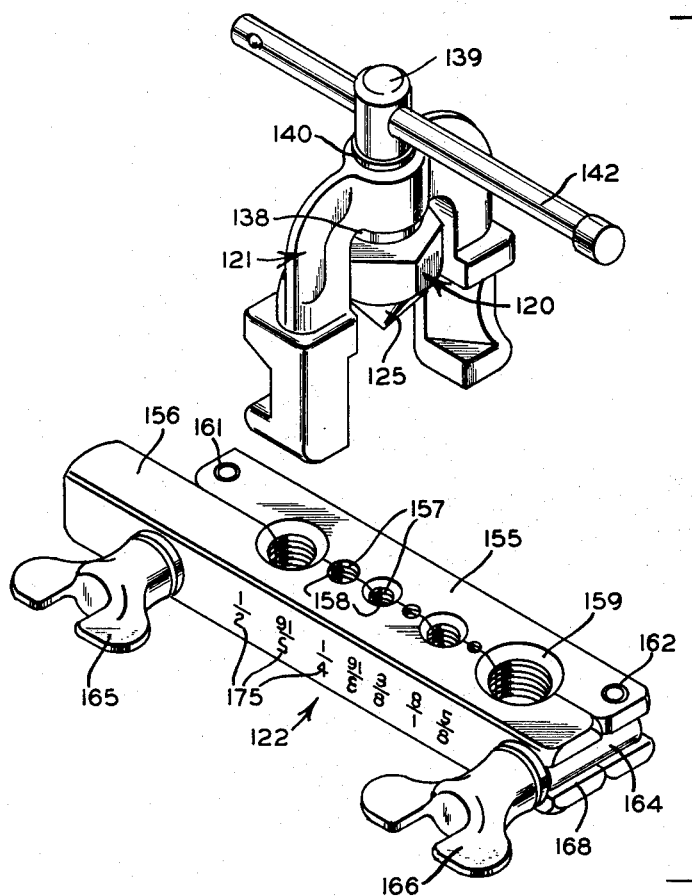
Figure 9:
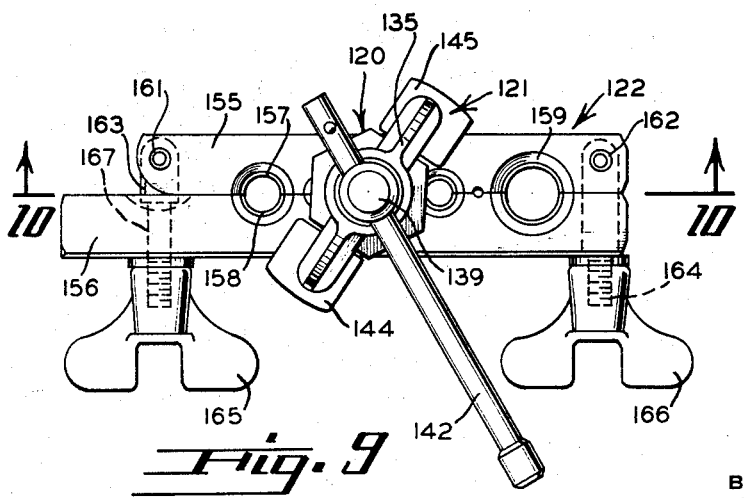

Further objects and advantages of the invention will be apparent from the following description taken in conjunction with the drawings, wherein:

FIG. 1 is a plan view of a flaring tool constituting a preferred embodiment of the invention;
FIG. 2 is a side view of the tool shown in FIG. 1;
FIG. 3 is a section taken along the line 3—3 of FIG. 2;
FIG. 4 is an end view of the tool shown in the preceding figures but with the reamer swung into position above the end of the tube;
FIG. 5 is a fragmentary side view of the tool partly in section, showing the formation of a double flare on the tube end;
FIG. 6 is a section taken along the line 6—6 of FIG. 4;
FIG. 7 is a section taken along the line 7—7 of FIG. 3;
FIG. 8 is a perspective exploded view of a modification of the invention;
FIG. 9 is a top plan view of the invention disclosed in FIG. 8, fully assembled for operation;
FIG. 10 is a section taken along the line 10—10 of FIG. 9;
FIG. 11 is a top plan view of the clamping device disclosed in FIG. 8 with the clamping blocks open;
FIG. 12 is a side elevation of the flaring cone and yoke disclosed in FIG. 8;
FIG. 13 is a section taken along the line 13—13 of FIG. 12;
FIG. 14 is a section taken along the line 14—14 of FIG. 12.

As indicated in FIG. 4, the flaring tool illustrated therein is comprised of four main units, namely, a clamping die 10 for holding the tube to be flared, a plurality of forming dies 11 mounted in a die holder which can be rotated to bring any selected one of the forming dies into position over the end of the tube, a flaring cone 12 and a reamer 13 mounted on opposite ends of a pivoted arm which may be rotated to bring either the reamer into position over the end of the tube to be flared as shown in FIG. 4, or to bring the flaring cone thereover as shown in FIG. 3.

These four main component parts of the tool are supported on a common axle or post 14 which, together with the spaced clamping die plates 15 and 16 comprise what may be referred to as the body or frame of the flaring tool. The plates 15 and 16 are identical as to shape and size and each is provided with a projecting handle portion 17 which provides a convenient means for handling the tool and holding it against movement during tube flaring operations. The plates 15 and 16 are held in spaced relation by a pair of spacing sleeves 18 through which pass rivets 19 which extend through holes provided in the plates 15 and 16 and are swaged over on the outer faces of the plates to hold them rigidly in their spaced relation.

The plates 15 and 16 serve to support between them the novel annular form of clamping die which is of exceptionally compact construction and which includes an annular clamping block 25 within which is situated an inner clamping block 26 which is journaled for rotation about the axle 14. Each block is provided with a plurality of semi-cylindrical clamping recesses 27 of different sizes, the recesses in block 25 matching those in the block 26. Each pair of matching recesses comprises a tube clamping die for seizing and holding a particular size of tube. A number of recesses 27 of different size are provided in each block so that different sizes of tubes may be accommodated by the clamping die. Each recess 27 is chamfered around its upper edge, as indicated by reference number 28 in FIG. 3, the angle of each chamfer corresponding to the angle of the flaring cone so that when the cone is forced into the end of the tube, it will expand the tube into intimate contact with the chamfered face 28 formed on the clamping die.

The clamping block 26 is provided with a central bore which has a free running fit on a sleeve 29 which surrounds the lower end of the axle 14. If desired, this sleeve may be formed as an integral part of the axle 14 rather than a separate sleeve as shown in the drawings. The sleeve is clamped to the axle by nuts 30 which are received on threaded portions of the axle and are tightened down against washers interposed between the nuts and the ends of the tube 29. Accordingly, the clamping block 26 may be rotated so as to bring any one of the recesses 27 formed therein into alignment with a pair of vertically aligned apertures 31 provided in the plates 15 and 16. To facilitate alignment of the recesses 27 in the block with the apertures 31, the block 26 is provided on its lower face with a series of dimples for receiving a ball detent 32 which is received in a hole provided in the lower plate 15 and is resiliently urged into engagement with the dimples in the block 26 by a leaf spring 33 attached to the plate 15. The dimples are so spaced around the block 26 as to register with the ball detent 32 whenever a recess 27 is in alignment with the apertures 31.

Clamping block 26 is in the form of an irregular six-sided polygon, the sides containing the larger recesses 27 being longer than those containing the smaller recesses. By this construction the block may be made smaller and lighter than the conventional prior art clamping blocks which were in the form of a regular polygon with sides of equal length. This feature is disclosed and claimed in the co-pending application Serial No. 274,403, filed March 1, 1952, now Patent No. 2,711,773 for Tube Flaring Tool.

The annular clamping block 25 is of such thickness as to be freely slidable in the space between the plates 15 and 16 and is of such diameter as to permit the matching recesses 27 to be separated sufficiently to enable a tube which has been flared to be withdrawn from the clamping die. The annular clamping block 25 is connected with the inner block 26 for substantially conjoint rotational movement while at the same time permitting independent sliding movement of block 25 with respect to block 26 as described in Patent No. 2,852,839. For this purpose, block 25 is provided with an elongated slot 34 within which is received a pin 35 projecting from block 26, as disclosed in FIG. 6. Hence, as the annular block 25 is rotated, it will carry block 26 with it and maintain the matching recesses 27 in the two blocks in substantial alignment as the blocks are rotated to bring the desired size of clamping die into position between the apertures 31. Rotation of the clamping blocks is accomplished by grasping the annular block 25 with the hand and rotating the same in either direction until the desired size of die is brought into alignment with the apertures 31. As block 25 is thus rotated, inner block 26 will be constrained to rotate in unison therewith by virtue of the interengagement of the pin 35 and slot 34.

After the die of desired size is aligned with apertures 31, the tube to be flared is inserted in the tool as indicated in phantom outline in FIG. 3 after which annular clamping block 25 is forced against the inner clamping block 26 by means of a clamping screw 40 which is received in a tapped hole extending transversely through the lower end of a swivel post 41. As shown in FIG. 3, the lower end of the post is provided with shoulder portions 42 which are received in suitable holes provided in plates 15 and 16. The holes in the plates are of such size as to snugly receive the shoulder portions 42 while at the same time permitting rotation of these portions within the holes. The swivel post 41 is provided with screw threads above and below the portions 42 for receiving retaining nuts 43 which are screwed against washers interposed between the nuts and the shoulder portions 42. Hence, when it is desired to release a tube which has been flared from the clamping die, the screw 40 may be loosened after which it may be swung clear of clamping block 25 by swinging the screw together with the swivel post 41 through an angle of approximately 90°. The clamping block 25 will then be free to slide a considerable distance so as to completely release the flared tube from the die and permit the flared end to be withdrawn from the die.

In order to provide a flare upon the end of a tube clamped within the clamping die 10, a flaring cone 45 (FIG. 3) is so arranged that it may be swung over the end of the tube and thereafter advanced downwardly into the tube so as to spread the end thereof outwardly into engagement with the chamfer 28 provided around the upper edge of the die opening. As shown in this figure, cone 45 is provided at its lower end with the usual conical flaring surface and is provided at its upper or base end with a shank 46. In the base of the cone is an internally threaded bore 47 which meshes with threads 48 provided on the lower end of an operating spindle 49. Spindle 49 is rotatably journaled in a pivoted arm 50 by means of a machined cylindrical surface 51 thereon which is received in a bore provided in the arm 50. Upward thrust produced on the spindle 49 as the cone is being forced into the end of the tube is taken up by a ball bearing 52 interposed between a flange 53 provided on the spindle and a recessed seat provided in the under side of the arm 50. The spindle is retained in place in the arm by means of a snap ring 54 which is adapted to seat in a groove 55 provided in the spindle above the arm 50. Spindle 49 is provided at its upper end with a square shank 56 by means of which the spindle may be rotated by a wrench 57. This wrench consists of a yoke 58, the arms of which are bored to receive a turning handle 59, the bail of the yoke being provided with a square hole for receiving the square shank 56.

The arm 50, upon which the flaring cone 45 is supported, is journaled for rotation on the upper end of the axle 14. For this purpose the axle is provided at its upper end with a tenon 65 which is received within a bore provided in the center of the arm 50. The arm is retained on the tenon 65 by means of a retaining nut 66 screwed onto the threaded end of the axle 14 and tightened down against washers interposed between the nut and the tenon 65. By means of this construction, the arm 50 may be swung about its pivot on the axle 14 so as to bring either the flaring cone or the reamer into position over the end of the tube to be flared. In order to secure the arm 50 in either of its selected positions, the arm is provided at each end with a notch 67 which is adapted to engage with a tenon 68 provided on the upper end of the swivel post 41 when the arm is swung to either its reaming or flaring position. The upper end of the post 41 is threaded to receive a wing nut 69 which may be tightened to clamp the arm in place with either the flaring cone or the reamer located above the tube held in the clamping die 10.

To prevent the flaring cone 45 from rotating with the operating spindle 49 as the latter is turned by the wrench 57 an eyebolt 70 is screwed into a tapped hole provided in the side of the cone, the eye of the bolt being received over the axle 14 so as to permit the bolt to slide up and down along the axle as the cone is fed into or out of engagement with a tube held in the clamping die. Since cone 45 is held stationary as the operating spindle 49 is rotated, the meshing engagement of threads 47 and 48 on the cone and spindle, respectively, will cause the cone to be fed upwardly or downwardly on the spindle as the latter is revolved in one direction or the other.

Before flaring the end of a tube in the clamping die 10, it is usually preferable to dress off the end of the tube to remove any burr thereon before running the flaring cone into the tube. This may be accomplished by a conventional rose reamer 75 which is carried on the lower end of a spindle 76. The spindle 76 is journaled within a threaded sleeve 77 which is received within a tapped hole provided in the arm 50. The spindle 76 is provided at its upper end with a square shank 78 for turning the reamer 75. Shank 78 is preferably the same size as the square shank 56 on the flaring cone spindle so that the same wrench 57 may be used for rotating either the cone or the reamer. The tightening screw 40 for the clamping die is also preferably provided with a square head 79 which also corresponds in size to the shanks 78 and 56 so that wrench 57 may be used to tighten the clamping die on the tube to be flared.

To permit free turning of the reamer 75 and the spindle 76 relative to sleeve 77 regardless of the thrust produced on the reamer by the end of the tube operated upon, an anti-friction bearing is interposed between the lower end of the sleeve 77 and the upper face of reamer 75. As illustrated, this bearing is in the form of small steel balls 80 running in raceways provided in the lower end of the sleeve and the upper face of the reamer, but it is to be understood that any other suitable form of anti-friction bearing may be substituted in place of balls 80.

Spindle 76 is retained within sleeve 77 by means of a snap ring 81 which engages with a groove formed in the upper end of the spindle and retains a washer which is interposed between the snap ring and the upper end of sleeve 77.

The reamer of the present invention is provided with a burnishing control whereby after the reamer has been fed down against the end of the tube to remove any burr therefrom, the feed may be released and the reamer rotated without further advancement so that any roughness or teeth marks will be removed and a smooth, polished beveled surface will result. For this purpose a pawl and ratchet drive is provided between spindle 76 and threaded sleeve 77. By shifting the position of the pawl, the operator of the tool may determine whether the spindle and sleeve are to rotate together as a unit to effect downward feeding of the reamer, or whether the sleeve is to be permitted to remain stationary while the spindle revolves to effect a smoothing action of the reamer against the work.

As shown in FIG. 3, the upper end of sleeve 77 is provided with an annular flange 82 which is surmounted by a square shank 83. Resting on flange 82 is a bottom plate 84 of a driving arm 85. Plate 84 is provided with a circular aperture 87 which fits over the square shank 83 and permits the plate to rotate with respect to sleeve 77. The driving arm 85 also includes an upper plate 86 which is provided near its center with a square aperture for receiving the square shank 78 on the upper end of spindle 76. Driving arm 85 is therefore constrained to rotate with the spindle 76 but is free to rotate relative to threaded sleeve 77 by virtue of aperture 87 which is large enough to slip over the square shank 83 on the upper end of the sleeve as disclosed in FIG. 7. A driving pawl 88 is mounted for pivotal movement between plates 84 and 86 of the driving arm by a pin 89 passing through the plates and the pawl. Pawl 88 is of double ended construction and includes an advancing finger 90 and a backing off finger 91. These fingers are adapted to engage the teeth of a ratchet 92 which is provided with a square hole corresponding in size to the square shank 83 on the sleeve. Hence, when the pawl and ratchet drive is assembled as indicated in FIG. 3 with the ratchet 92 in place on square shank 83, the ratchet and sleeve will be keyed for conjoint rotation as are pawl 88 and spindle 75. A detent spring 93 is carried by pawl 88 between fingers 90 and 91, this spring being provided with a pair of V-shaped notches for receiving a pin 94 projecting upwardly from the bottom plate 84. Thus, pawl 88 will be resiliently held with either the advancing finger 90 or the backing off finger 91 in engagement with the teeth of the ratchet.

When the advancing finger 90 is in engagement with the teeth of the ratchet, rotation of spindle 76 in a clockwise direction by wrench 57, will cause finger 90 to engage between the teeth of the ratchet and cause the threaded sleeve 77 to be rotated clockwise in unison with the reamer spindle. Hence, the reamer will be fed downwardly to engage reamer 75 with the end of the tube and remove any burrs which might be present thereon. After the reaming operation has been completed, the operator can, by flicking the pawl 88 into the position in which the backing off finger engages between the teeth of the ratchet, disconnect the drive between the spindle 76 and the sleeve 77 so that the spindle may continue to rotate clockwise while the sleeve remains stationary. Thus, there will be no further downward feeding movement of the reamer and a few turns of the reamer will serve to remove any teeth marks or roughness on the chamfered surface formed by the reamer on the end of the tube. The backing off finger 91 will ratchet freely over the teeth of ratchet 92 as the spindle is turned clockwise permitting sleeve 77 to remain at rest. The anti-friction bearing 80 facilitates this operation since it provides for substantially frictionless engagement between the reamer and the sleeve 77. In other words, the frictional restraint between the threads of sleeve 77 and the internal threads on arm 50 is greater than that between the sleeve and the spindle so that the sleeve will remain stationary while the reamer rotates. If the operator now rotates wrench 57 counter clockwise, the backing off finger 91 will engage between the teeth of the ratchet and cause sleeve 77 to rotate with spindle 75 in a counter-clockwise direction thereby withdrawing the reamer from the end of the tube. When it is again desired to ream the end of a tube held in the clamping die, all that the operator needs to do is flip ratchet 88 so that upon clockwise rotation of the handle, sleeve 77 will be rotated clockwise by finger 90 and feed the reamer downwardly into engagement with the tube.

For certain types of thin walled tubing, it is desirable to provide a double flare, i.e., a flare formed of two thicknesses of metal in place of one. This is accomplished by forcing a forming die against the end of the tube to bell out the end of the tube and form an inwardly directed lip thereon as indicated in phantom outline in FIG. 5. After this preliminary forming operation has been accomplished, a double flare can then be produced by running the flaring cone down into the tube in the usual manner so as to fold the end of the tube back on itself to form a double flare. In the tool shown herein, a set of forming dies has been provided for fitting different sizes of tubes held in the clamping die so, that if desired, a double flare may be produced on the end of a tube instead of a single flare. The forming dies, indicated generally at 11, are supported by a sheet metal die holder 100 which is preferably made of a single piece of metal having inverted cups 101 formed therein to provide recesses for receiving and holding the individual forming dies. At its center, the holder 100 is formed with a bearing sleeve 102 which is adapted to be received on the sleeve 29 surrounding the lower end of axle 14 and journal the holder for rotation about the axle. The nut 30 and washer located therebeneath serve to retain the holder in place on the upper face of the plate 16.

Since the tool as illustrated, is adapted to handle six different sizes of tubing, holder 100 is provided with three cups 101 (FIG. 1) each containing a forming die 103. Each die 103 is in the form of a cylindrical button provided with two concentric pressure faces 104 and 105 for providing the preliminary shaping of two different sizes of tubes.

Each forming die is provided with a peripheral face which engages the sides of its cup 101 to guide the die for vertical sliding movement within the cup. Each die is resiliently held in its raised position, as shown in FIG. 3, by compression springs 106 which surround stems 107 projecting from the upper face of the die. Each stem passes through a hole provided therefor in its cup 101 and is provided in its upper end with a tapped hole to receive a spring retaining screw 108, the spring 106 being compressed between the head of the screw and the upper surface of cup 101. Each die is also provided with a central eminence 109 which, as shown in FIGS. 1 and 3, is provided with a conical seat 110 for receiving the point of the flaring cone 45. When the flaring cone is centered over a tube held in the clamping die as shown in FIG. 3, and the die holder 100 is indexed to bring the proper size forming die into position over the end of the tube, the point of the flaring cone will lie above the seat 110 in the forming die. Hence, when spindle 49 of the flaring cone is rotated by wrench 57 in a clockwise direction, the cone will center in the seat 110 and press the forming die 101 down against the tube. This will cause the pressure face 104 or 105 thereon corresponding to the size of the tube held in the clamping die, to form over the end of the tube and give it the shape indicated in phantom outline in FIG. 5. After this has been done and the flaring cone 45 is retracted from seat 110, the holder 100 is turned about axle 14 so as to bring the cut-out portion 111 of the holder into position shown in FIG. 1 so as to uncover the end of the tube and permit the flaring cone 45 to be pressed down into the tube to complete the double flare thereon.

While the manner of using this new and improved form of tube flaring tool should be evident from the foregoing description, a brief statement of its operation in forming either a single or a double flare on the end of the tube will now be given.

Holding handle 17 of the tool with his right hand, the operator, with his left hand, grasps the annular clamping die 25 and rotates the same to bring the proper size of die opening into alignment with apertures 31 formed in the plates 15 and 16. As the annular block 25 is rotated, the inner clamping block 26 will likewise be turned about the axle 14 by reason of the engagement of pin 35 thereon with slot 34 in the annular clamping block 25. When the proper size recess 27 in the inner clamping block 26 is brought into alignment with the apertures 31, ball 32 (FIG. 3), will seat within the dimple provided in the bottom of the block and yieldingly retain the block in its adjusted position. The tube to be flared is now inserted into the clamping die and the clamping screw 40 is swung into clamping position and tightened by means of wrench 57 to securely fasten the tube within the clamping die.

Reamer 75 is now swung into position over the end of the tube which projects upwardly a short distance above the surface of plate 16. Wing nut 69 is then tightened to clamp arm 50 in position after which wrench 57 is applied to square shank 78 on the spindle 76 of the reamer. Upon clockwise rotation of the wrench, pawl 88 is moved so that advancing finger 90 engages between the teeth of ratchet 92 and thus threaded sleeve 77 will be rotated in unison with the reamer so as to feed the same downwardly into engagement with the end of the tube. After the burr has been removed from the tube, pawl 88 is flipped so as to bring the backing off finger 91 into engagement with the ratchet after which several additional clockwise turns of the wrench serve to remove any tooth marks from the chamfer formed by the reamer. During the several additional clockwise rotations of the reamer, sleeve 77 will remain stationary since the frictional restraint between the threads thereof and the internal threads of the hole in arm 50 is greater than the frictional restraint between the spindle and the sleeve. Since the detent spring 93 applies only a light pressure on pawl 88, finger 91 will ratchet lightly over the teeth of ratchet 92 without any tendency to rotate the sleeve 77. Wrench 57 is then rotated counterclockwise to cause finger 91 to engage between the teeth of ratchet 92 and so cause sleeve 77 to be rotated counterclockwise to withdraw the reamer from the end of the tube.

If only a single flare is desired, the flaring cone 45 is swung into position over the end of the tube by releasing wing nut 69 and rotating arm 50 approximately 180°. The wing nut is then clamped with the flaring cone in position over the tube after which wrench 57 is applied to the square shank 56 on the upper end of the flaring cone spindle and the spindle rotated clockwise to force the cone down into the end of the tube to produce the desired flare thereon. During clockwise rotation of the threaded lower end of spindle 49, cone 45 is prevented from rotating by engagement of the eye 70 with axle 14. Hence the threads 48 on the spindle will rotate within the threads 47 provided in the cone and cause downward feeding movement of the cone into the tube. After the flare has been produced, clamping screw 40 may be released and swung 90° so as to release the annular clamping block 25 and free the tube.

If a double flare is desired, after the flaring cone 45 has been swung into position over the end of the tube, the forming die holder 100 is indexed around the axle 14 so as to bring the proper size of forming die over the end of the tube. Wrench 57 is then applied to the upper end of the spindle 49 and is rotated clockwise so as to force the point of the cone into the seat 110 provided on the eminence 109 on the forming die 103. The forming die will thereby be pressed downwardly against the urgency of the restoring springs 105 to cause either the face 104 or 105, as the case may be, to engage with the end of the tube and provide the preliminary forming thereof as indicated in phantom outline in FIG. 5. The flaring cone is then retracted by counterclockwise rotation of wrench 57 and the die holder 100 rotated so as to bring the cut-out portion 111 thereof into position above the tube as indicated in FIG. 1. Wrench 57 is again rotated in a clockwise direction so as to force the flaring cone 45 downwardly into the tube thereby bending the inwardly turned lip formed on the end of the tube by the die 103 down into the tube so as to form the end of the tube over on itself and provide the desired double flare thereon. In the formation of either a single flare or a double flare on the end of the tube, the chamfer 28 provided on the clamping block serves to support the outer face of the tube as the flaring cone spreads it into contact therewith, thereby assisting in the formation of an accurately formed flare on the end of the tube.

FIGS. 8–14 disclose a modification of a flaring cone and tube clamping assembly in which the flaring cone 120 has a similar type of driving and guiding mechanism as the cone 12 disclosed in FIG. 3. In this modification, the flaring cone 120 is mounted for axial feeding movement in the frame or yoke 121, which is adapted to be rigidly assembled with the tube clamping mechanism 122.

Flaring cone 120 includes a tube flaring conical surface 125 and a polygonal base section 126, which is disclosed in the drawings as hexagonal. As best disclosed in FIG. 10, an internally threaded bore or hole 127 is formed coaxially within the cone 120 and opening in the top surface of the base portion 126. A spindle 130 has an externally threaded bottom end portion 131 for threadedly engaging the bore 127 to feed or drive the flaring cone 120 coaxially along and relative to the spindle 130. An intermediate portion 132 of the spindle 130 has a smooth cylindrical surface which is rotatably received in a mating cylindrical opening or bore 133 within the cross arm 135 of the yoke 121. Thrust ball bearings 136 are received in an annular recess or raceway 137 in the bottom portion of the arm 135, and retained therein by an annular collar or flange 138 fixed to the spindle 130. The upper end portion 139 of the spindle 130 is enlarged and provides a space above the top of the arm 135 to receive a snap ring 140. Thus, the snap ring 140 and the collar 138 securely hold the intermediate portion 132 within the bore 133 to prevent axial movement of the spindle 130 relative to the yoke 121, but to permit free rotatable movement of the spindle 130 within the arm 135. A handle 142 is connected to the upper end portion 139 in order to rotate the spindle 130.

The yoke 121 further includes a pair of posts 144 and 145 integral with and depending from opposite ends of the cross arm 135. As best disclosed in FIGS. 12 and 14, the opposing inner surfaces 146 and 147 of the posts 144 and 145, respectively, are flat and parallel to each other and parallel to the feeding axis of the cone 120. Moreover, the inner surface 146 is spaced closely adjacent to the opposing flat surface or side wall 150 of the hexagonal base portion 126 in order to prevent rotation of the cone 120 as it is being fed or driven axially of the spindle 130. The post surface 147 is also spaced closely adjacent the opposite surface or side wall 151 of the hexagonal base portion 126 to further assist in guiding the cone 120 during its axial feeding movement without rotation. Although the surfaces 146 and 150 and 147 and 151 are disclosed spaced closely adjacent to each other in FIGS. 12 and 14, these corresponding opposing surfaces may be in sliding engagement if desired. It will be further observed that the radial distance from the axis of the cone 120 to either of its side walls 150 or 151 is slightly less than the distance between the axis and the post surfaces 146 and 147. Also, the radial distance between the axis of the cone 120 and the intersecting corners of the bases 150 and 151 with their adjacent polygonal side walls is greater than the distance between the axis of the cone 120 and the respective post surfaces 146 and 147. With these geometrical limitations, it is obvious that the polygonal or hexagonal base portion 126 will prevent the cone 120 from rotating as it is being fed parallel to the posts 144 and 145.

The clamping device or mechanism 122 comprises a pair of substantially rectangular clamping blocks 155 and 156 adapted to abut flush against each other. The abutting or inner surfaces of the blocks 155 and 156 include a plurality of semi-circular recesses, or holes, 157 and 158 of different sizes, with the semi-circular holes of corresponding sizes being adapted to register with each other in order to form a full-sized hole for receiving a tube of the corresponding size between the blocks 155 and 156 for flaring. It will be further noted that alternating recesses 157 and 158 are chamfered at 159 on opposite sides of the clamping blocks in order to accommodate the maximum number of holes in the clamping mechanism 122.

The opposite ends of the block 155 are provided with pivot posts 161 and 162, swing bolts 163 and 164, and wing nuts 165 and 166 to swing in the planes of the assembled clamping blocks 155 and 156. The opposite ends of the block 156 are provided with the closed slot 167 for receiving the swing bolt 163 and the open ended slot 168 for receiving the swing bolt 164. Thus, with the swing bolts 163 and 164 in their respective slots 167 and 168, the wing nuts 165 and 166 are tightened to rigidly hold the clamping blocks 155 and 156 together and the recesses 157 and 158 in registry with each other for securely holding a tube in flaring position.

The yoke 121 is assembled upon the clamping mechanism 122 by means of the angular slots 171 and 172 on the inside surfaces of the bottom or end portions of the posts 144 and 145. It will be noted that the inner faces of the slots 171 and 172 are formed at angles to the post faces 146 and 147, yet the slot faces 171 and 172 are parallel with each other and spaced from each other a sufficient distance that they will abut flush against the opposite outside faces of the assembled clamping blocks 155 and 156, as disclosed in FIG. 9. Thus, the yoke 121 may be adjusted to slide along the blocks 155 and 156 to register the axis of the cone 120 with any of the registered recesses 157 and 158.

As best disclosed in FIG. 8, each of the mating pairs of recesses 157 and 158 may be identified with their corresponding tube size by means of the indicating numerals 175.

In order to operate the modification of the invention disclosed in FIGS. 8–14, the clamping mechanism 122 is dis-assembled from the yoke 121, the wing nuts 165 and 166 loosened on their respective swing bolts 163 and 164 and the clamping blocks 155 and 156 pivoted away from each other to the position disclosed in FIG. 11. The tube to be clamped is then fitted between the mating apertures 157 and 158 corresponding to the particular tube size designated by a numeral 175, and the blocks 155 and 156 are closed against each other and clamped in that position by tightening the wing nuts 165 and 166. The handle 142 is counter-rotated to withdraw the flaring cone 120 to its upper limit toward the cross arm 135.

The yoke 121 is then fitted over the closed clamping mechanism 122 so that the slots 171 and 172 will slidably engage the opposite outside surfaces of the clamping blocks 155 and 156. The yoke is then moved along the clamping blocks until the flaring cone 120 is axially aligned with the tube to be flared. The handle 142 is then rotated to drive, or feed, the flaring cone downwardly by the operation of the interengaging threaded surfaces 127 and 131. Since the spindle 130 is constrained against axial movement, by the thrust collar 138 and the snap ring 140, but is freely rotatable and the flaring cone 120 is restrained against rotatable movement by the flat surfaces 146–150 and 147–151, the flaring cone 120 will be driven axially downward into the open end of the clamped tube. Continued rotation of the spindle 130 will flare the cone outwardly against the corresponding chamfer 159 of the clamping recesses 157 and 158. After the tube has been sufficiently flared, the handle 142 is then counter-rotated to retract the flaring cone upwardly, the yoke 121 is then removed from the clamping mechanism 122, and the wing nuts 165 and 166 are unthreaded to open the clamping blocks 155 and 156 and release the flared tube.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:
1. A tube flaring tool comprising:
 (a) clamping means for holding a tube to be flared,
 (b) a post having first and second ends,
 (c) means for supporting said clamping means on said first end,
 (d) an arm supported on said second end,
 (e) a flaring cone having an internally threaded hole,
 (f) a spindle having an externally threaded end portion for threadedly engaging said hole,
 (g) means for journaling said spindle in said arm for non-axial rotary movement for driving said cone toward and away from said clamping means, and
 (h) means interengaging said post and said flaring cone to prevent rotation of said cone when said cone is driven.
2. The invention according to claim 1 in which said clamping means comprises a pair of tube clamping blocks, said blocks having opposing mating recesses for receiving tubes of different sizes to be flared.
3. The invention according to claim 2 in which said clamping blocks are adjustable with respect to said post in order to axially align a pair of mating recesses with the axis of said flaring cone.
4. The invention according to claim 1 in which said post is parallel to said driving axis.
5. The invention according to claim 4 in which said interengaging means comprises a guide means on said cone for slidably engaging said post during the axial movement of said cone.
6. The invention according to claim 5 in which said guide means comprises a guide member fixed to said cone and encircling said post.
7. The invention according to claim 6 in which said guide member comprises an eye bolt, said post extending through the eye of said eye bolt.
8. The invention according to claim 5 comprising a first flat guide surface on said cone and second flat guide surface on said post opposing and proximate to said first guide surface.
9. The invention according to claim 8 in which said cone comprises a polygonal cross-section in which one side of said polygon comprises said first guide surface, the radial distance from the conical axis to said first guide surface being less than the distance from said conical axis to said second guide surface, and the radial distance between said conical axis and the corners of said first guide surface being greater than the distance between said conical aixs and said second guide surface.
10. The invention according to claim 1 in which said journaling means comprises a circular opening extending through said arm coaxially with said driving axis, said spindle having a smooth, unthreaded cylindrical portion rotatably received in said opening, thrust bearings fixed to said spindle to prevent axial movement of said spindle relative to said arm, and means for turning said spindle.

11. The invention according to claim 10 in which at least some of said thrust bearings comprise ball bearings.

12. A tube flaring tool comprising:
  (a) a pair of tube clamping blocks,
  (b) a plurality of recesses in each block, comprising pairs of opposing mating recesses in said blocks for receiving tubes of different sizes to be flared,
  (c) a post having first and second ends,
  (d) means for journaling one of said blocks on said first end,
  (e) an arm journaled on said second end,
  (f) a flaring cone provided with internal screw threads,
  (g) a spindle journaled in said arm for rotation about an axis parallel to said post and having external screw threads for meshing with said internal screw threads,
  (h) means for preventing rotation of said cone and causing reciprocation thereof relative to said arm when said spindle is rotated,
  (i) means for rotating said spindle,
  (j) a forming die, and
  (k) a holder for said die journaled on said post between said arm and said clamping blocks.

13. The invention according to claim 12 in which said means for preventing the rotation of said cone comprise means on said flaring cone engaging said post.

References Cited by the Examiner
UNITED STATES PATENTS

| | | | |
|---|---|---|---|
| 981,492 | 1/11 | Stevens | 77—73 |
| 1,940,420 | 12/33 | Kerns | 153—79 |
| 1,950,154 | 3/34 | Rosenberg | 153—79 |
| 2,662,575 | 12/53 | Wolcott | 153—79 |
| 2,852,839 | 9/58 | Wilson | 153—79 |

CHARLES W. LANHAM, *Primary Examiner.*